US012811533B1

(12) United States Patent
Chatterjee et al.

(10) Patent No.: US 12,811,533 B1

(45) Date of Patent: Nov. 24, 2026

(54) POWER MODULE PHASE LEG BASED ALTERNATING-PULSE WIDTH MODULATION FOR INVERTER

(71) Applicant: GM GLOBAL TECHNOLOGY OPERATIONS LLC, Detroit, MI (US)

(72) Inventors: Abir Chatterjee, Novi, MI (US); Mohammad N. Anwar, Northville, MI (US); Khorshed Mohammed Alam, Canton, MI (US); Brian A Welchko, Oakland Township, MI (US); Vinod Chowdary Peddi, Shelby Township, MI (US); Yuying Shi, Novi, MI (US); Brent Steven Gagas, Pleasant Ridge, MI (US); Kerrie Marie Ball, Rochester Hills, MI (US); Song He, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/309,894

(22) Filed: Aug. 26, 2025

(51) Int. Cl.

| | |
|---|---|
| ***H02P 27/08*** | (2006.01) |
| ***B60L 15/00*** | (2006.01) |
| ***B60L 50/51*** | (2019.01) |
| ***B60L 50/60*** | (2019.01) |
| ***H02P 29/68*** | (2016.01) |

(52) U.S. Cl.
CPC ............ *H02P 27/08* (2013.01); *B60L 15/007* (2013.01); *B60L 50/51* (2019.02); *B60L 50/60* (2019.02); *H02P 29/68* (2016.02); *B60L 2210/44* (2013.01)

(58) Field of Classification Search
CPC .......... H02P 27/08; H02P 29/68; B60L 50/60; B60L 50/51; B60L 15/007; B60L 2210/44
USPC .......................................................... 307/9.1
See application file for complete search history.

(56) References Cited

U.S. PATENT DOCUMENTS

| | | | | |
|---|---|---|---|---|
| 8,421,391 | B2 * | 4/2013 | Yeh | G01K 7/42 318/473 |
| 9,444,389 | B2 * | 9/2016 | Kadry | H02P 29/68 |
| 9,590,540 | B2 | 3/2017 | Wu et al. | |
| 2004/0124808 | A1 * | 7/2004 | Hirono | H02P 27/08 318/806 |
| 2024/0072717 | A1 * | 2/2024 | Nagarale | H02P 29/68 |

* cited by examiner

*Primary Examiner* — Alfonso Perez Borroto
(74) *Attorney, Agent, or Firm* — Ingrassia Fisher & Lorenz, LLP | IFL

(57) ABSTRACT

An electric vehicle propulsion system including an inverter including a first inverter leg, a second inverter leg and a third inverter leg and an inverter controller for generating a first inverter control signal in response to a first vehicle parameter, the second inverter control signal in response to the first vehicle parameter and the third inverter control signal in response to the first vehicle parameter wherein the first inverter control signal is indicative of a first pulse width modulated signal having a one hundred percent duty cycle and wherein the third inverter control signal is indicative of a third pulse width modulated signal having a less than one hundred percent duty cycle and wherein the first vehicle parameter includes an inverter coolant temperature exceeding a threshold temperature.

20 Claims, 7 Drawing Sheets

300

400

600

POWER MODULE PHASE LEG BASED ALTERNATING-PULSE WIDTH MODULATION FOR INVERTER

INTRODUCTION

The present disclosure generally relates to automotive electrical systems and electric vehicle propulsion systems, and more particularly relates to a method and apparatus to implement a control system for controlling an electric vehicle inverter by using space vector pulse width modulation and discrete pulse width modulation.

Modern electric vehicles (EVs) offer sustainable and efficient transportation. Powered by electric motors, EVs deliver instant torque, resulting in smooth and responsive acceleration. Typically, there are two main types of electric motors used in EVs: induction motors and permanent magnet synchronous motors (PMSMs). Induction motors are the most common type of electric motor used in EVs as they are very efficient, and they can provide a high torque output. PMSMs are often used in high-performance EVs, such as sports cars and racing cars. Modern EVs typically have two electric motors, one for each axle, but some EVs can have a single motor located under the hood or four motors, one for each wheel, or three motors or a combination thereof. Regenerative braking technology further enhances efficiency by capturing kinetic energy during deceleration and converting it into electricity. As battery technology advances, EVs are becoming increasingly practical for everyday use, with longer ranges, faster charging times, and lower maintenance costs. It is desirable to continue to improve EV performance through refined inverter control and motor drive control. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are vehicle propulsion methods, systems and related electrical systems for charging electric vehicle batteries, methods for making and methods for operating such systems, and motor vehicles and other equipment such as aircraft, trucks, buses, forklifts, construction vehicles and other electric vehicles equipped with auxiliary power outlets. By way of example, and not limitation, there are presented various embodiments of systems for providing a power module phase leg based alternating pulse width modulation for system optimization for inverter.

In accordance with an aspect of the present disclosure, an electric vehicle propulsion system including a battery for supplying a direct current voltage an inverter including a first inverter leg, a second inverter leg and a third inverter leg for converting the direct current voltage to an alternating current voltage in response to a first inverter leg control signal coupled to the first inverter leg, a second inverter leg control signal coupled to the second inverter leg, and a third inverter control signal coupled to the third inverter leg, and for coupling the alternating current voltage to an electric motor, and an inverter controller for generating the first inverter control signal in response to a first vehicle parameter, the second inverter control signal in response to the first vehicle parameter and the third inverter control signal in response to the first vehicle parameter wherein the first inverter control signal is indicative of a first pulse width modulated signal having a one hundred percent duty cycle and wherein the third inverter control signal is indicative of a third pulse width modulated signal having a less than one hundred percent duty cycle and wherein the first vehicle parameter includes an inverter coolant temperature exceeding a threshold temperature.

In accordance with another aspect of the present disclosure, the third pulse width modulated signal is a discontinuous pulse width modulated signal.

In accordance with another aspect of the present disclosure, the first pulse width modulated signal and the second pulse width modulated signal are space vector pulse width modulated signal In accordance with another aspect of the present disclosure, the second inverter control signal is indicative of a second pulse width modulated signal having a one hundred percent duty cycle In accordance with another aspect of the present disclosure, the second inverter control signal is indicative of a second pulse width modulated signal having a less than one hundred percent duty cycle and wherein the inverter coolant temperature exceeds s second threshold temperature wherein the second threshold temperature is greater than the threshold temperature.

In accordance with another aspect of the present disclosure, the inverter control is further configured for determining a torque/speed operating region in response to a torque command and a speed command and wherein the first inverter control signal, second inverter control signal and the third inverter control signal are determined in response to the torque/speed operating region.

In accordance with another aspect of the present disclosure, the less than one hundred percent duty cycle is varied between zero percent and ninety nine percent in incremental angles.

In accordance with another aspect of the present disclosure, the third inverter control signal is generated in response to a transistor material of the third inverter leg.

In accordance with another aspect of the present disclosure, the first inverter leg includes a first silicon transistor, the second inverter leg includes a second silicon transistor and the third inverter leg includes a first silicon carbide transistor.

In accordance with another aspect of the present disclosure, a method of controlling an inverter in an electric vehicle propulsion system including receiving, at an inverter input, a direct current voltage from a battery, a battery for supplying a direct current voltage, converting, by the inverter including a first inverter leg, a second inverter leg and a third inverter leg, the direct current voltage to an alternating current voltage in response to a first inverter leg control signal coupled to the first inverter leg, a second inverter leg control signal coupled to the second inverter leg, and a third inverter control signal coupled to the third inverter leg, generating, by an inverter controller, the first inverter control signal in response to a first vehicle parameter, the second inverter control signal in response to the first vehicle parameter and the third inverter control signal in response to the first vehicle parameter wherein the first inverter control signal is indicative of a first pulse width modulated signal having a one hundred percent duty cycle and wherein the third inverter control signal is indicative of a third pulse width modulated signal having a less than one hundred percent duty cycle and wherein the first vehicle parameter includes an inverter coolant temperature exceeding a threshold temperature, and coupling the alternating current voltage to an electric motor.

In accordance with another aspect of the present disclosure, the third pulse width modulated signal is a discontinuous pulse width modulated signal.

In accordance with another aspect of the present disclosure, the first pulse width modulated signal and the second pulse width modulated signal are space vector pulse width modulated signal.

In accordance with another aspect of the present disclosure, the second inverter control signal is indicative of a second pulse width modulated signal having a one hundred percent duty cycle.

In accordance with another aspect of the present disclosure, the second inverter control signal is indicative of a second pulse width modulated signal having a less than one hundred percent duty cycle and wherein the inverter coolant temperature exceeds s second threshold temperature wherein the second threshold temperature is greater than the threshold temperature.

In accordance with another aspect of the present disclosure, the inverter control is further configured for determining a torque/speed operating region in response to a torque command and a speed command and wherein the first inverter control signal, second inverter control signal and the third inverter control signal are determined in response to the torque/speed operating region.

In accordance with another aspect of the present disclosure, the less than one hundred percent duty cycle is varied between zero percent and ninety nine percent in incremental angles.

In accordance with another aspect of the present disclosure, third inverter control signal is generated in response to a transistor material of the third inverter leg.

In accordance with another aspect of the present disclosure, wherein the first inverter leg includes a first silicon transistor, the second inverter leg includes a second silicon transistor and the third inverter leg includes a first silicon carbide transistor.

In accordance with another aspect of the present disclosure, an electric vehicle propulsion system including a battery for supplying a direct current voltage, an inverter including a first inverter leg, a second inverter leg and a third inverter leg for converting the direct current voltage to an alternating current voltage in response to a first inverter leg control signal coupled to the first inverter leg, a second inverter leg control signal coupled to the second inverter leg, and a third inverter control signal coupled to the third inverter leg, and for coupling the alternating current voltage to an electric motor, an inverter controller for generating the first inverter control signal in response to a first vehicle parameter, the second inverter control signal in response to the first vehicle parameter and the third inverter control signal in response to the first vehicle parameter wherein the first inverter control signal is indicative of a first pulse width modulated signal having a one hundred percent duty cycle and wherein the third inverter control signal is indicative of a third pulse width modulated signal having a less than one hundred percent duty cycle and wherein the first vehicle parameter includes an inverter coolant temperature exceeding a threshold temperature, and an electric motor configured to propel a vehicle in response to the alternating current voltage.

In accordance with another aspect of the present disclosure, the third pulse width modulated signal is a discontinuous pulse width modulated signal and the first pulse width modulated signal and the second pulse width modulated signal are space vector pulse width modulated signals.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term “module” refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
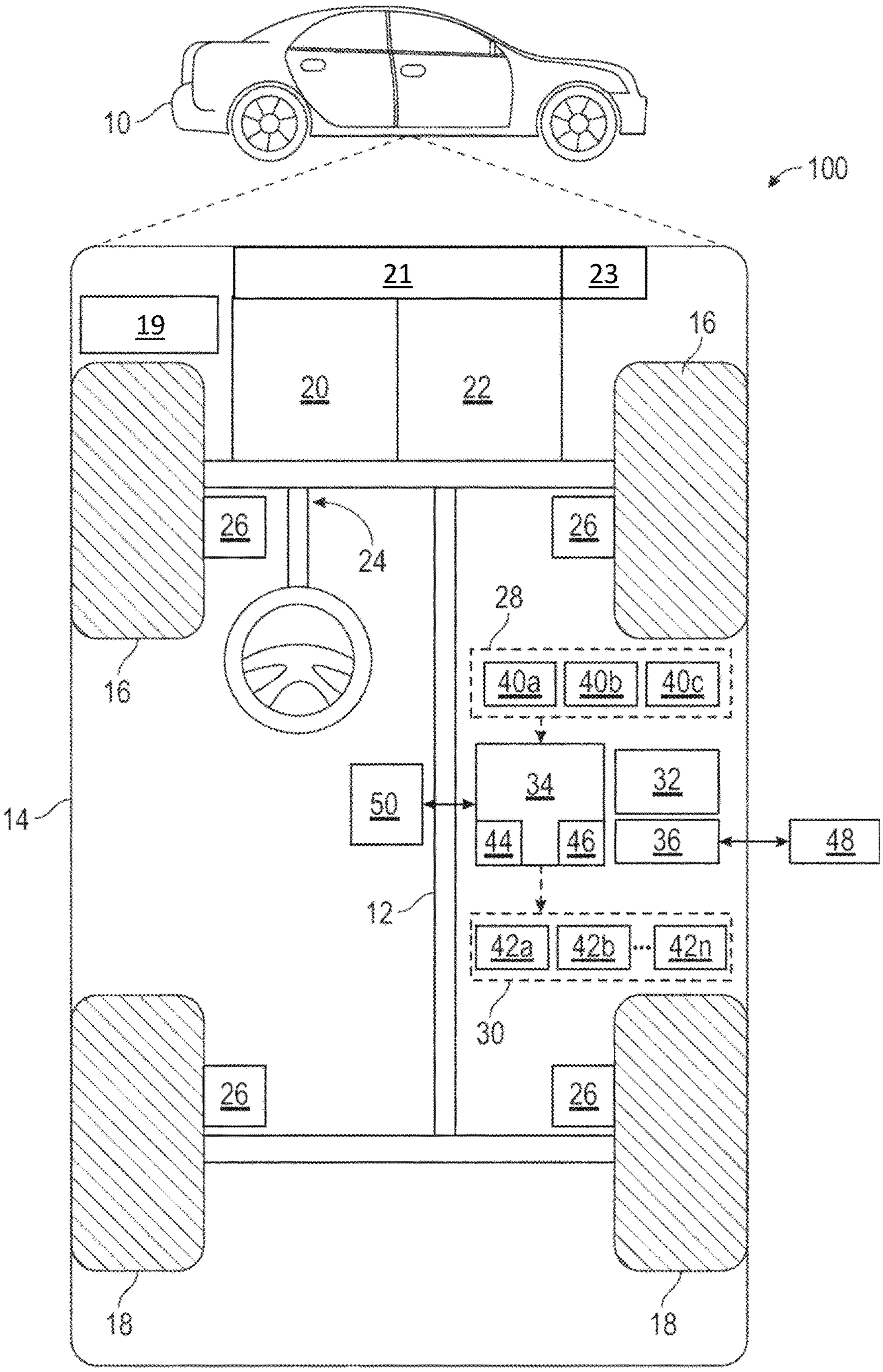
FIG. 1 shows a control system associated with a vehicle in accordance with various embodiments.

With reference to FIG. 1, a control system 100 is associated with a vehicle 10 (also referred to herein as a "host vehicle") in accordance with various embodiments. In general, the control system (or simply "system") 100 provides for control of various actions of the vehicle 10 (e.g., torque control) established by Reinforcement Learning (RL) which is or can be stored in a deep neural network (DNN) type model that controls operation in response to data from vehicle inputs, for example, as described in greater detail further below in connection with FIGS. 2-4.

In various exemplary embodiments, system 100 provides a process using an algorithm that controls torque and speed in a host vehicle's 10 embedded controller software of the system 100 allowing DNN to be used for a automated cruise control behavior prediction model. The system 100 enables learning of driver's preference for following distance for different vehicles such a target vehicle and to classify driver's preference based on driving scenarios; e.g., traffic signs, stop and go traffic, city driving, and the like. The system 100 uses a quadrature matrix to build a knowledge base for target vehicles following a performance preference by utilizing online and historical driver and environmental information.

As depicted in FIG. 1, vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, vehicle 10 is autonomous or semi-autonomous, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally includes a propulsion system 20, a transmission system 22, a steering system 24, a brake system 26, a canister purge system 31, a sensor system 28, an actuator system 30, at least one data storage device 32, and at least one controller 34. The propulsion system 20 may, in various embodiments, an electric machine such as a traction motor, a battery 21, an inverter 19 for converting DC current from the battery to alternating current (AC) current to be supplied to the electric machine, and an onboard charger (OBC) 23 for converting AC current from an external power source to a DC current to be used to charge the battery 21. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmissions.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences the position of the vehicle wheels 16 and/or 18. While depicted as including a steering wheel for illustrative purposes, in some embodiments contemplated within the scope of the present disclosure, the steering system 24 may not include a steering wheel.

The controller 34 includes at least one processor 44 (and neural network) and a computer-readable storage device or media 46. As noted above, in various embodiments, the controller 34 (e.g., the processor 44 thereof) provides data pertaining to a projected future path of the vehicle 10, including projected future steering instructions, to the steering system 24 in advance, for use in controlling steering for a limited period of time in the event that communications with the steering system 24 become unavailable.

In various embodiments, controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store multiple neural networks, along with various operating variables, while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As depicted in FIG. 1, the vehicle 10 generally includes, in addition to the above-referenced steering system 24 and controller 34, a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

The controller 34 includes a vehicle controller that operates based on the neural networks model's output. In an exemplary embodiment, a feed-forward operation can be applied for an adjustment factor that is the continuous output of the neural network models to generate a control action for the desired torque or other like action (in case of a continuous neural network models, for example, the continuous prediction values are outputs).

In various embodiments, one or more user input devices receive inputs from one or more passengers (and driver 11) of the vehicle 10. In various embodiments, the inputs include a desired destination of travel for the vehicle 10. In certain embodiments, one or more input devices include an interactive touch-screen in the vehicle 10. In certain embodiments, one or more input devices include a speaker for receiving audio information from the passengers. In certain other embodiments, one or more input devices may include one or more other types of devices and/or may be coupled to a user device (e.g., smartphone and/or other electronic devices) of the passengers.

The sensor system 28 includes one or more sensors 40*a*-40*n* that sense observable conditions of the exterior environment and/or the interior environment of the vehicle 10. The sensors 40*a*-40*n* include but are not limited to, radars, lidars, global positioning systems, optical cameras, thermal cameras, ultrasonic sensors, inertial measurement units, and/or other sensors.

The actuator system 30 includes one or more actuators 42*a*-42*n* that control one or more vehicle features such as, but not limited to, the intake system 38, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 10, including the storing of data of a DNN that is established by the RL, used to predict a driver behavior for the vehicle control. In various embodiments, the data storage device 32 stores a machine learning model of a DNN and other data models established by the RL. The model established by the RL can take place for a DNN behavior prediction model or RL established model. In an exemplary embodiment, no separate training is required for the DNN rather, the DNN behavior prediction model (i.e., DNN prediction model) is implemented with a set of learned functions. In various embodiments, the neural network (i.e., DNN behavior prediction model) may be established by RL or trained by a supervised learning methodology by a remote system and communicated or provisioned in vehicle 10 (wirelessly and/or in a wired manner) and stored in the data storage device 32. The DNN behavior prediction model can also be trained via supervised or unsupervised learning based on input vehicle data of a host vehicle operations and/or sensed data about a host vehicles operating environment.

The data storage device 32 is not limited to control data, as other data may also be stored in the data storage device 32. For example, route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of controller 34, separate from controller 34, or part of controller 34 and part of a separate system.

Controller 34 implements the logic model established by reinforced learning (RL) or for the DNN based on the DNN behavior model that has been trained with a set of values, includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Figure 2:
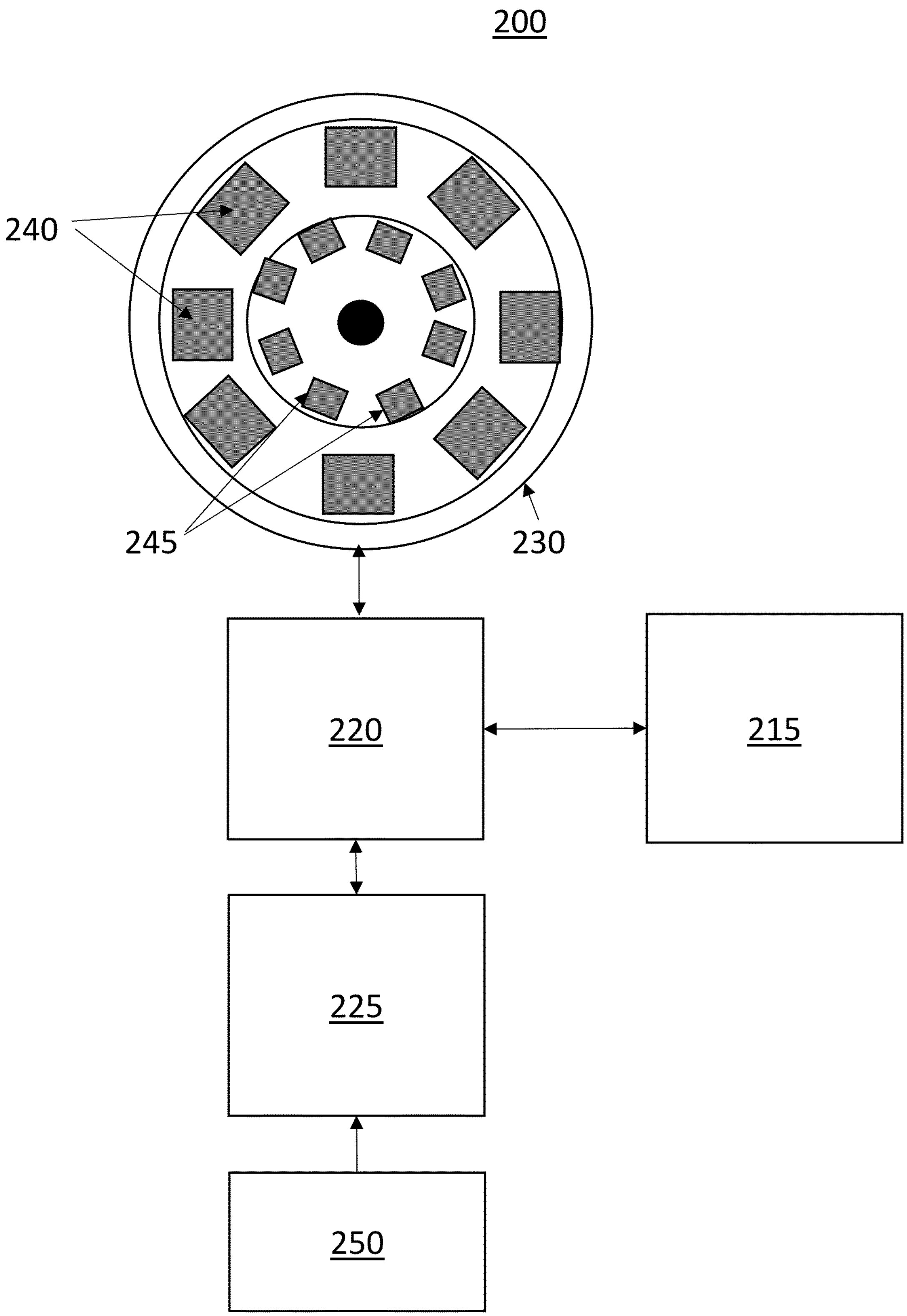
FIG. 2 shows a block diagram illustrating an exemplary electric vehicle propulsion system including an inverter controller for providing a power module phase leg based alternating pulse width modulation for an inverter according to exemplary embodiments.

Turning now to FIG. 2, an exemplary electric vehicle (EV) propulsion system 200 including an inverter controller 215 for providing a power module phase leg based alternating pulse width modulation for an inverter 220 according to exemplary embodiments. The exemplary EV propulsion system 200 further includes an electric motor 230, a battery management system (BMS) 250, and a battery 225.

The EV propulsion system 200 centers around a high-voltage battery 225, which stores direct current (DC) electrical energy. During operation, this DC power is fed to the inverter 220, which converts the battery's DC output into alternating current (AC) power suitable for driving the electric motor 230. The electric motor 230, can include a four terminal or three terminal electric motor, a three-phase synchronous or induction type motor, or a single phase motor with a start and run winding. The inverter 220 supplies the AC electrical energy to a plurality of rotor windings 240 generating an alternating magnetic force which works against a magnetic force of a plurality of stator windings 245, whereby generating a mechanical rotational motion of the rotor which is coupled to a drive system configured for propelling the electric vehicle.

The inverter controller 215 acts as the brain that precisely manages the flow of electrical power from the battery 225 to the electric motor 230, and vice-versa during regenerative braking. This control is achieved by meticulously orchestrating the switching of high-power semiconductor devices, typically insulated-gate bipolar transistor (IGBT) or silicon carbide (SiC) metal-oxide-semiconductor field-effect transistors (MOSFET), within the inverter 220. The controller employs sophisticated algorithms, predominantly pulse width modulation (PWM) or space vector pulse width modulation (SVPWM), to generate precise gate drive signals for these switches. By varying the duty cycle (the on-time) and frequency of these pulses, the controller synthesizes a multi-phase sinusoidal alternating current (AC) voltage waveform from the battery's direct current (DC) voltage. This synthesized AC voltage, with its controlled frequency and amplitude, directly dictates the speed and torque of the electric motor 230. For example, the inverter controller 215 can generate a series of PWM signals, typically by comparing a low-frequency sinusoidal reference waveform, representing the desired motor phase voltage, with a high-frequency triangular carrier wave. The intersection points determine the on/off times of the inverter switches. This method allows the inverter to synthesize an approximate sinusoidal AC voltage waveform from the DC battery voltage, enabling variable frequency and amplitude control of the motor. Furthermore, the inverter controller 215 can implement advanced motor control strategies, such as Field-Oriented Control (FOC), which requires real-time feedback from motor position and current sensors. This feedback allows the inverter controller 215 to continuously adjust the switching patterns to optimize efficiency, maximize torque delivery, manage thermal performance, and ensure smooth, responsive vehicle operation across the entire driving range, including bidirectional power flow for regenerative braking.

Figure 3:
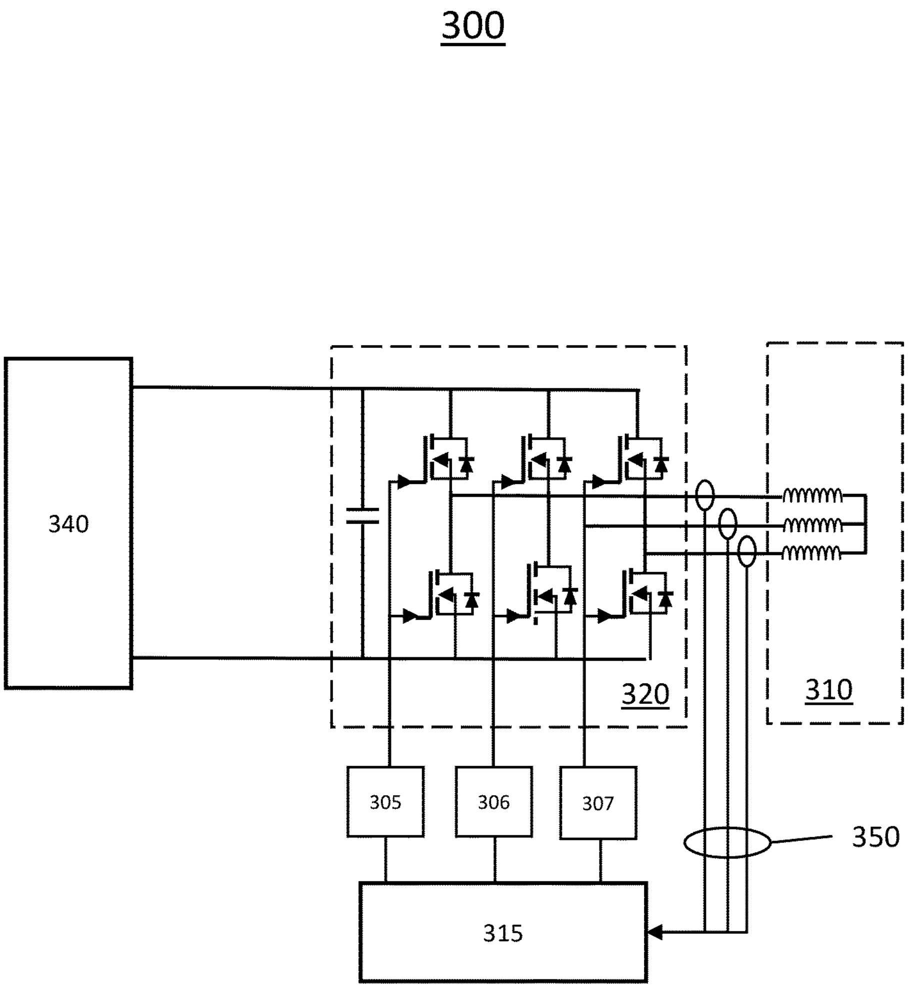
FIG. 3 shows, a schematic illustrating an exemplary electric vehicle propulsion system including an inverter controller for providing a power module phase leg based alternating pulse width modulation for an inverter according to exemplary embodiments.

Turning now to FIG. 3, a schematic representative of an exemplary electric vehicle (EV) propulsion system 300 including an inverter controller 315 for providing a power module phase leg based alternating pulse width modulation for an inverter 320 according to exemplary embodiments is shown. The exemplary propulsion system 300 can include a battery 340, an inverter 320, an electric motor 310, an inverter controller 315 a first gate driver 305, a second gate driver 306 and a third gate driver 307.

In some exemplary embodiments, the inverter 320 can have a three-phase, two-level voltage source inverter topology. The inverter 320 can include three half-bridge legs, each comprising two series-connected switching devices, such as insulated-gate bipolar transistors (IGBT) or metal-oxide-semiconductor field-effect transistors (MOSFET), with anti-parallel diodes across each switch to provide a path for reactive current flow. A common direct current (DC) bus, represented by the parallel capacitor at the input, supplies the rectified DC voltage to all three legs. The output of each half-bridge, taken from the midpoint between the two switches, forms one phase of the three-phase alternating current (AC) output. By employing pulse-width modulation (PWM) techniques, the gate signals to these six switches are precisely controlled to synthesize a desired three-phase AC voltage waveform from the constant DC input, enabling the conversion of DC power into variable frequency and amplitude AC power.

The first gate driver 305, second gate driver 306 and a third gate driver 307 act as power interfaces configured to control the switching behavior of power semiconductor devices, such as MOSFETs and IGBTs. The gate driver 305, 306, 307 translate control signals from the inverter controller 315 into the high-current, low-voltage pulses necessary to rapidly charge and discharge the intrinsic gate capacitance of these power switches in the inverter 320 in order to minimize switching losses which are proportional to the rise and fall times of the gate voltage and current. In addition, the gate drivers 305, 306, 307 can further perform voltage level shifting to translate logic-level signals, such as 3.3V or 5V, to the optimal gate drive voltage, such as 10-20V, for full device saturation. The gate drivers 305, 306, 307 can further provide electrical isolation to separate the high-voltage power stage from the sensitive low-voltage control circuitry in order to mitigate common-mode noise and prevent ground loops. Furthermore, gate drivers 305, 306, 307 can include integrated protection features like under-voltage lockout, overcurrent protection, and precise dead-time control for half-bridge or full-bridge configurations to ensure the power devices operate within prescribed limits and preventing shoot-through events, thereby extending system longevity and reliability.

In some exemplary embodiments, the inverter controller 315 controls the conversion of DC power from the battery 340 into variable frequency and amplitude AC power required to drive the electric motor 310. Pulse-width modulation (PWM) techniques can be used where the inverter controller 315 generates high-frequency switching signals which are then coupled to the inverter's power semiconductor devices via the gate drivers 305, 306, 307. Current sensors 350, typically Hall-effect or shunt-based, measure the actual instantaneous phase currents flowing into the electric motor 310 and provide real-time current feedback from the motor windings. These measured current values are then fed back to the inverter controller 315. Within the inverter controller 315, these current values are continuously compared against the desired current values, which are derived from the driver's accelerator pedal input and vehicle dynamics. Any deviation between the measured and reference currents generates an error signal, which the inverter controller 315 processes using advanced algorithms like field-oriented control or direct torque control. Based on this error, the inverter controller 315 dynamically adjusts the PWM duty cycles and switching patterns of the inverter's power switches, thereby correcting the output voltage and frequency to precisely regulate the motor's torque and speed, ensuring optimal efficiency, smooth operation, and robust protection against overcurrent conditions.

In some exemplary embodiments, the inverter controller 315 can use a novel alternating PWM (APWM) technique to optimize the performance and thermal management of power inverters, particularly those utilizing silicon (Si) and silicon carbide (SiC) switches. APWM enables the dynamic combination of standard Space Vector Modulation (SVM)

with Discrete PWM (DPWM) based on the instantaneous angular position (0-360 degrees) within a fundamental sine wave period. This allows for selective application of different PWM strategies to specific phases of the inverter. The primary advantage of this selective application is the control of junction temperature. Furthermore, it allows for mitigation of issues like bearing current ripple which are influenced by PWM techniques. The transition between SVM and DPWM within APWM can be smooth and can be applied strategically across the torque-speed plane of the inverter.

APWM can be used for thermal optimization of the inverter 320, such as in inverters with coolant loops where a temperature gradient can exist between the inlet and outlet. In traditional inverters, the phase nearest the coolant outlet experiences higher temperatures (10-15° C. higher) due to the warmed coolant, necessitating design for the worst-case scenario. APWM addresses this by enabling the reduction of switching events in specific phases, particularly those experiencing higher temperatures. This is achieved by strategically applying DPWM, which can involve periods where a phase does not switch at all (e.g., duty cycle of 1), thereby reducing switching losses and heat generation. This flexibility allows for increased current capacity without requiring larger switching device surface areas. Hybrid power stages which integrate different semiconductor materials, such as Si and SiC, within the same inverter 320 can be used for optimization of thermal performance.

APWM facilitates a smooth, gradual transition across a fundamental cycle by incrementally adjusting the proportion of SVPWM and DPWM from 0% (pure SVPWM) to 100% DPWM. Instead of instantaneous changes, APWM leverages incremental angles where, for a specific phase leg, no switching events occur. This controlled desynchronization of switching events across individual phases during the transition window (APWM 0% to APWM 100%) minimizes switching losses, reduces electromagnetic interference (EMI), and enhances the converter's overall efficiency and the spectral purity of its output. The resulting waveform boasts reduced harmonic content and an improved dynamic response compared to schemes that rely on hard switching between modulation strategies.

APWM's continuous transition from SVPWM (APWM 0%) to full DPWM (APWM 100%) to independently tailor the modulation for each leg reduces hardware cost and improves efficiency. For instance, legs under higher thermal stress or with less stringent noise requirements can utilize a greater percentage of DPWM to reduce switching losses and enhance heat rejection, boosting reliability. Conversely, legs critical for minimizing Common Mode (CM) and Differential Mode (DM) noise, or those contributing to bearing damage through high dv/dt, can be modulated with a higher proportion of SVPWM or specific low-CMV DPWM variants to reduce switching events and transient voltages. Furthermore, the strategy considers HV ripple, dynamically adjusting modulation to optimize DC-link capacitor ripple current, thereby extending component lifetime and potentially lowering overall system cost by decreasing capacitance requirements.

APWM offers advantages in heterogeneous power modules that integrate both Silicon (Si) IGBTs and Silicon Carbide (SiC) MOSFETs, by enabling precise balancing of junction temperature distribution to address the inherent differences in thermal characteristics and switching losses between Si and SiC devices. For example, SiC MOSFETs typically exhibit lower switching losses and higher thermal conductivity than Si IGBTs, allowing them to operate at higher junction temperatures. APWM intelligently leverages this disparity by dynamically adjusting the modulation strategy (SVPWM, APWM %, or DPWM) for each leg, leading to a more even distribution of heat generation, preventing localized hotspots, and extending the overall module lifespan. By strategically shifting the operating points of individual legs along the APWM continuum, the system can prioritize cooling for the more thermally sensitive Si devices while maximizing the performance benefits of SiC. Beyond instantaneous thermal balancing, APWM increases long-term reliability in heterogeneous HPS power modules by matching the differing sensitivities of Si and SiC devices. Si and SiC technologies exhibit distinct degradation mechanisms and rates under thermal cycling, making uniform junction temperature profiles across the module insufficient for optimal lifetime. APWM's intelligent modulation allows for selective stress distribution, preventing premature failure in the more sensitive Si components while fully leveraging the robustness of SiC. This strategy encompasses balancing position-based junction temperature gradients within any power module, accounting for real-world variations such as differences between coolant inlet and outlet temperatures and flow rates. By dynamically adjusting the PWM strategy for each inverter leg (e.g., shifting towards more discontinuous modes on hotter legs to reduce switching losses), APWM actively mitigates localized thermal stresses and the accumulation of fatigue in solder layers, bond wires, and other packaging elements.

APWM's sophistication extends to meticulously balancing position-based junction temperature gradients within any given coolant flow strategy, encompassing both series and parallel cooling arrangements. This advanced thermal management is underpinned by a highly detailed thermal model, which can be either pre-calibrated through extensive characterization or dynamically estimated in real-time. This model accounts for critical factors such as varying coolant inlet and outlet temperatures, flow rates, and the specific thermal impedances of each power device and its surrounding packaging. By leveraging this granular thermal intelligence, APWM can proactively adjust the modulation index and, consequently, the switching losses of individual inverter legs. For instance, in a series flow system where devices downstream experience warmer coolant, APWM can shift these legs towards a higher DPWM percentage to reduce their power dissipation, thereby maintaining uniform junction temperatures across the entire module. Conversely, in parallel flow, if certain channels exhibit lower flow rates, APWM can compensate by adapting the local modulation to mitigate hotspot formation. In addition, APWM's advanced capabilities also extend to judiciously balancing losses among individual switches within a power module, critically accounting for end-of-line variations to optimize both efficiency and thermal stress across manufactured units. APWM can integrate specific calibration data, particularly for end-of-line parameters that influence device characteristics. For example, SiC MOSFETs can exhibit significant die-level variations in on-resistance, sometimes exceeding 20%. APWM leverages this information by dynamically tailoring the modulation strategy: devices with lower on-resistance, which inherently generate less conduction loss, can be strategically subjected to extended periods of SVPWM operation within the torque-speed plane. This allows for a more continuous and smoother output voltage, benefiting motor efficiency and noise, without compromising the thermal integrity of other devices in the module. Conversely, devices with higher on-resistance might be assigned more aggressive DPWM segments to mitigate their increased conduction losses.

APWM can integrate real-time battery State of Charge (SoC) and coolant temperature to intelligently balance Noise, Vibration, and Harshness (NVH) with switching losses, demonstrating a nuanced understanding of device physics. This control strategy dynamically assigns DPWM to the minimum necessary number of phase legs, reserving SVPWM for the remaining legs to enhance NVH characteristics whenever switching loss considerations permit. For instance, at lower DC bus voltages (characteristic of lower SoC) or reduced junction temperatures, the inherent switching losses of IGBTs decrease, creating an opportunity to shift more operation towards SVPWM without incurring excessive thermal penalty. Conversely, SiC MOSFETs, which can exhibit an inverse relationship between switching loss and temperature in certain operating regions, may allow for more flexible DPWM application at higher temperatures if it aligns with the overall thermal balancing objectives. By continuously evaluating these parameters, APWM optimally leverages the trade-off between switching frequency-induced NVH and thermal dissipation.

Figure 4:
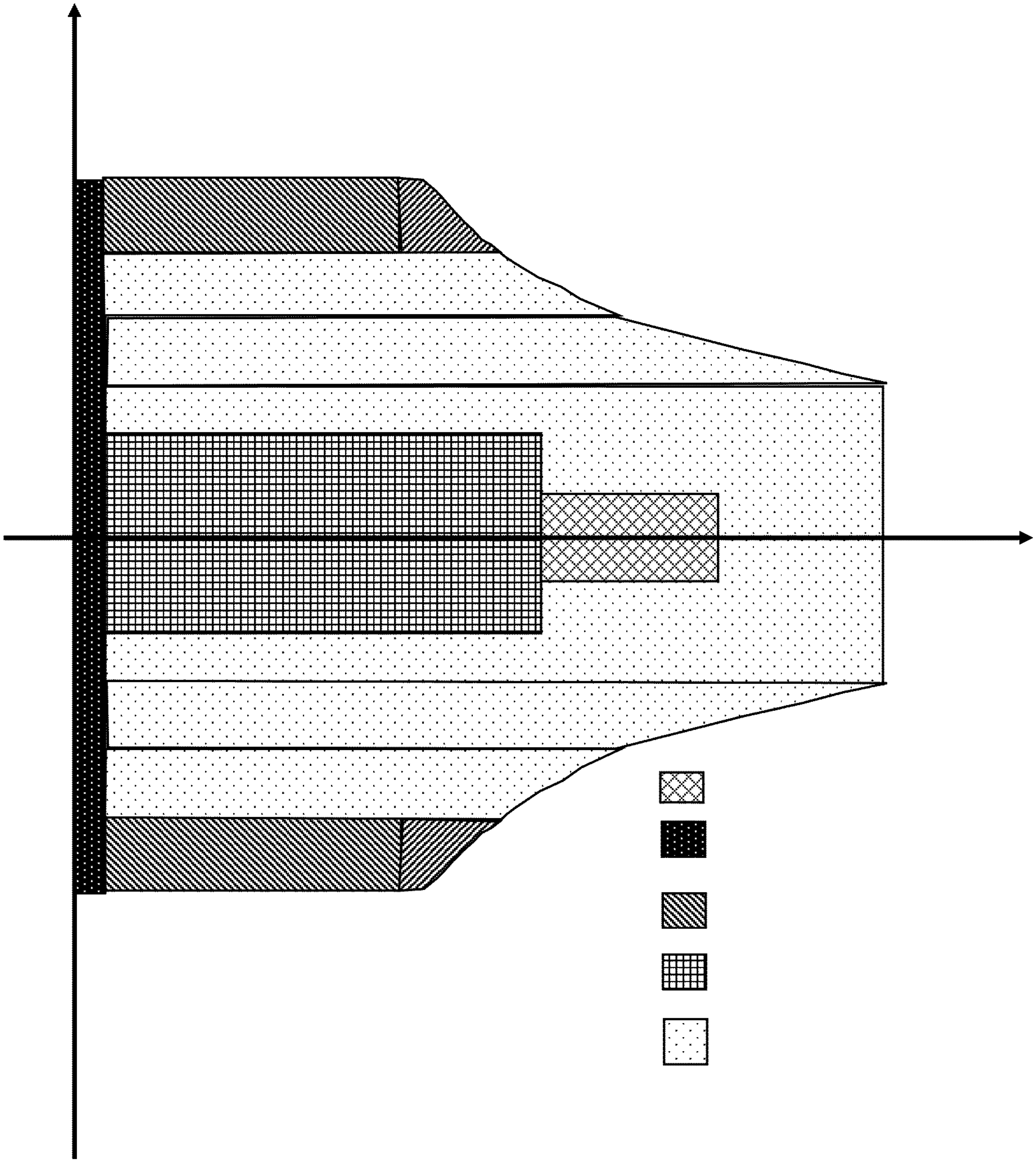
FIG. 4 shows a chart illustrating pulse width modulation control zones for electric vehicle propulsion system providing a power module phase leg based alternating pulse width modulation for an inverter according to an exemplary embodiment of the present disclosure.

Turning now to FIG. 4, a chart 400 illustrating pulse width modulation (PWM) control zones for electric vehicle (EV) propulsion system providing a power module phase leg based alternating pulse width modulation (APWM) for an inverter according to an exemplary embodiment of the present disclosure is shown. The APWM is used to dynamically select distinct PWM techniques for each inverter leg of a three phase EV propulsion inverter to adaptively deploy techniques such as Space Vector PWM (SVPWM), and discrete PWM (DPWM). The APWM strategy is used to balance thermal performance, enhance system efficiency, mitigate electromagnetic noise and ripple, and reduce bearing wear.

The Worst Case Operating Point (WCOP) is a critical design determinant for power inverters, characterized by conditions of high torque and low speed. These regions, situated at both positive and negative low-speed, high-torque quadrants of the torque/speed plane, represent the thermal worst-case scenarios for the inverter. It is at WCOP that the inverter experiences the highest current and associated losses, directly dictating the thermal design of the inverter and the appropriate sizing of its switching devices. Consequently, specific PWM strategies are mandated in these regions to effectively manage and reject the generated heat.

The Efficiency Centric Operating Profile (ECOP), often combined with the Bearing Current Operating Point (BCOP), represents a central and frequently visited operational zone for power inverters. This region, typically characterized by low torque to medium speed, is where the vehicle or inverter operates for the majority of its duty cycle. As such, switching strategies within ECOP are meticulously optimized for overall system efficiency. The convergence of ECOP and BCOP often involves Space Vector Modulation (SVM), specifically tuned to achieve both optimal system efficiency and effective bearing current mitigation, making it a critical region for everyday operation.

6-step and Zero Vector Modulation (ZVM) represent specialized control strategies within the torque/speed plane, distinct from standard Space Vector Modulation (SVM) or Discontinuous PWM (DPWM). These techniques are employed at very low speeds or during specific fault conditions. 6-step ZVM employs a switching strategy wherein switching occurs only six times per fundamental period, primarily near zero speed. The "Others" zones encompass a variety of additional specific operating modes or transitions requiring unique PWM control adaptations beyond the more commonly defined regions like continuous operation, peak power, or thermal worst-case conditions that exist within the inverters operational envelope.

Figure 5:
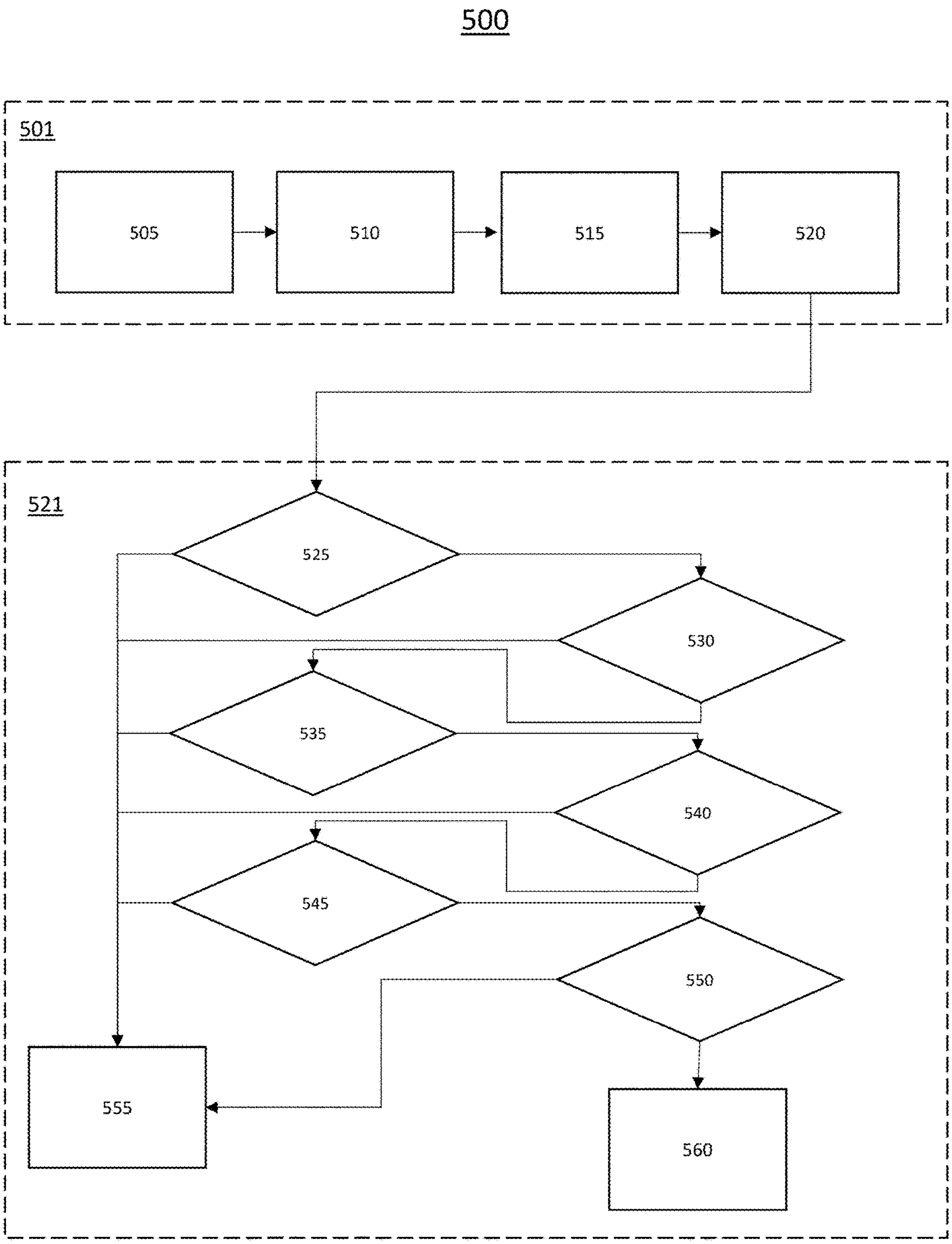
FIG. 5 shows a flow chart illustrating a method 500 for pulse width modulation control zones for a hybrid power stage according to an exemplary embodiment of the present disclosure

Turning now to FIG. 5, a flow chart illustrating a method 500 for pulse width modulation control zones for a hybrid power stage according to an exemplary embodiment of the present disclosure is shown. The method 500 is operative for applying different pulse width modulation (PWM) techniques across a torque-speed plane of the power inverter.

The outer loop 501 of the APWM algorithm initiates by determining 505 vehicle operational parameters such as torque, motor speed, and DC link voltage, coolant temperature and coolant flow. These inputs define the current operating point on the torque/speed plane, which is segmented into distinct PWM control zones including ECOP/BCOP (Efficiency Centric Operating Profile/Bearing Current Operating Point), WCOP (Worst Case Operating Point), 6-step, ZVM (Zero Vector Modulation), and "Others." Based on the identified zone, the algorithm determines the desired percentage of APWM for both Silicon (Si) (% APWM (Si)) and Silicon Carbide (SiC) (% APWM (SiC)) hardware in the respective inverter legs. This percentage is then converted into an "Angle Removed" (AnglRmv), calculated as 60*(% APWM)/2 for each phase (AnglRmv_ABC). Finally, this outer loop assigns the appropriate AnglRmv values to the Si or SiC hardware in each phase, effectively setting the target for the inner loop's modulation.

The inner loop 521 operates over each fundamental period, continuously evaluating the instantaneous voltage angle relative to the calculated "Angle Removed" for each phase and a particular power factor angle (pfAngle). The power factor angle is the angle between the voltage and current phasors in an AC circuit. This loop dictates whether to perform Discontinuous PWM (DPWM) 555 or Space Vector PWM (SVPWM) 560. This dynamic selection of DPWM or SVPWM on a per-phase basis, governed by the "Angle Removed" derived from the outer loop, allows the algorithm to precisely control the switching characteristics of each inverter leg, thereby optimizing thermal performance, efficiency, and other critical parameters in real-time.

After setting the target for the inner loop modulation, the method 500 next determines 525 if the Voltage Angle is greater than (30 degrees−pfAngl+AnglRmv_C) and if the Voltage Angle is less than or equal to (90 degrees−pfAngl−AnglRmv_C). The voltage angle refers to the phase angle of the voltage, often with respect to a reference, such as the current. The angle removed (AnglRmv_C) is derived from the outer loop 501. If the voltage angle is greater than (30 degrees−pfAngl+AnglRmv_C) and the Voltage Angle is less than or equal to (90 degrees−pfAngl−AnglRmv_C), the method 500 performs the DPWM 555.

If the voltage angle is not greater than (30 degrees−pfAngl+AnglRmv_C) or the voltage angle is not less than or equal to (90 degrees−pfAngl−AnglRmv_C), the method 500 next determines 530 if the voltage angle is greater than (210 degrees−pfAngl+AnglRmv_C) and is less than or equal to (270 degrees−pfAngl−AnglRmv_C). If so, the method performs the DPWM 555.

If the voltage angle is not greater than (210 degrees−pfAngl+AnglRmv_C) or less than or equal to (270 degrees−pfAngl−AnglRmv_C). The method 500 next determines 535 if the voltage angle is greater than (90 degrees−pfAngl+

AnglRmv_B) AND less than or equal to (150 degrees−pfAngl−AnglRmv_B). If so, the method performs the DPWM 555.

If the voltage angle is not greater than (90 degrees−pfAngl+AnglRmv_B) or is less than or equal to (150 degrees−pfAngl−AnglRmv_B). The method 500 next determines 540 if the voltage angle is greater than (270 degrees−pfAngl+AnglRmv_B) and is less than or equal to (350 degrees−pfAngl−AnglRmv_B). If so, the method performs the DPWM 555.

If the voltage angle is not greater than (270 degrees−pfAngl+AnglRmv_B) or is less than or equal to (350 degrees−pfAngl−AnglRmv_B). The method 500 next determines 545 if the absolute value of the voltage angle is less than 30°−pfAngl−AnglRmv_A. If so, the method performs the DPWM 555.

If the absolute value of the voltage angle is not less than 30°−pfAngl−AnglRmv_A), the method 500 next determines if the voltage angle is greater than (150 degrees−pfAngl+AnglRmv_A) and is less than or equal to (210 degrees-pfAngl-AnglRmv_A). If so, the method performs the DPWM 555. If the voltage angle is not greater than (150 degrees−pfAngl+AnglRmv_A) or is less than or equal to (210 degrees−pfAngl−AnglRmv_A, the method performs the SVPWM 560.

Figure 6:
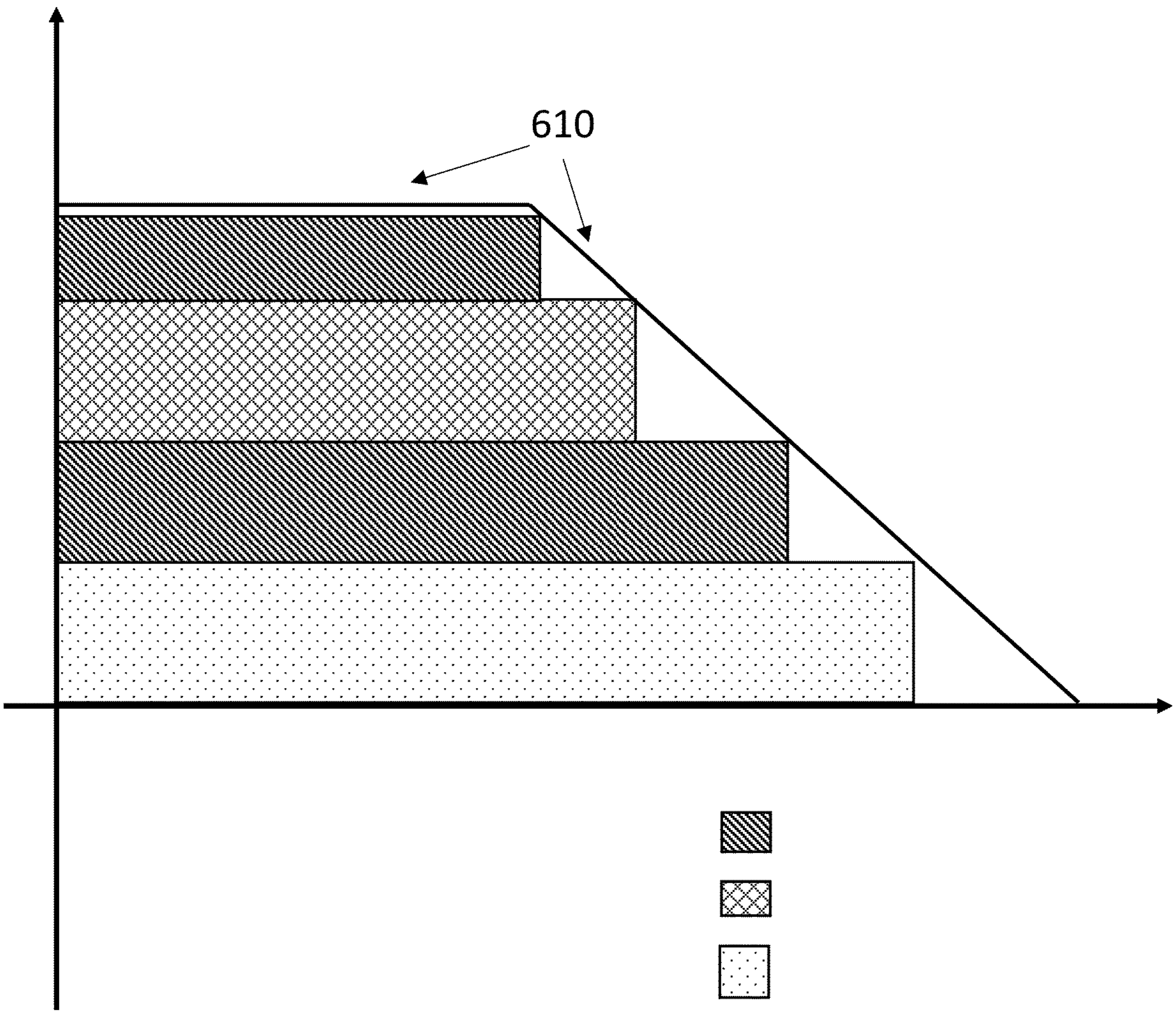
FIG. 6 shows a chart illustrating control zones for electric vehicle (EV) propulsion systems providing a weighted pulse width modulation (PWM) for an inverter according to an exemplary embodiment of the present disclosure.

Turning now to FIG. 6, a chart 600 illustrating control zones for electric vehicle (EV) propulsion systems providing a weighted pulse width modulation (PWM) for an inverter according to an exemplary embodiment of the present disclosure is shown. The chart 600 is illustrative of a torque versus speed curve, delineating operating regions for different PWM strategies showing regions for general discontinuous PWM (GDPWM) at lower torque and speed, space vector PWM (SVPWM) at higher torque, and weighted PWM occupying intermediate torque ranges and extending into the field weakening region where torque is reduced with increasing speed. A peak torque line 610 defines the maximum achievable torque.

This exemplary power module phase-leg based alternating PWM system for inverters involves integration of established PWM strategies, such as SVPWM and GDPWM to achieve an optimized balance between acoustic noise, mechanical vibration, and operational harshness (NVH) and power conversion losses on the other. Traditional SVPWM, while generally superior in terms of NVH characteristics due to its smoother voltage waveforms, typically incurs higher switching and conduction losses. Conversely, GDPWM often delivers lower power losses by strategically clamping certain inverter phases to the direct current (DC) bus, but this can lead to increased NVH due to the resulting discontinuous current waveforms.

The exemplary technique is configured to combine the zero vectors from both SVPWM and GDPWM to establish an operating point yielding intermediate NVH and power loss characteristics, providing a flexible trade-off not achievable with either method in isolation. The core mechanism involves dynamically altering the application of the zero voltage vector within the PWM scheme. This dynamic control enables the achievement of diverse and multiple control objectives, such as, reducing temperature imbalances across the individual phase legs of the inverter's power modules. Furthermore, the technique aims to mitigate bearing damage in the connected AC machine by controlling common-mode voltages and currents, to minimize electromagnetic interference (EMI) generation and to effectively manage and reduce overall NVH.

In some exemplary embodiments, the exemplary technique delineates three distinct approaches for zero vector application. The first involves the exclusive application of either SVPWM or GDPWM within specific, pre-defined regions of the fundamental electrical cycle. The second approach introduces a blending or weighting of the zero vectors derived from both SVPWM and GDPWM in order to create a new composite zero vector. This blending capability offers a continuous control spectrum between the two conventional PWM methods, moving beyond a simple binary switch, to allow continuous control facilitating a more refined and nuanced optimization for specific operational goals and real-time demands of the motor drive system. The exemplary technique is not limited to specialized hardware configurations such as hybrid power stages. Its applicability extends broadly to conventional inverter designs, encompassing those constructed with various semiconductor technologies, including traditional Silicon (Si) devices, as well as more advanced wide-bandgap materials like Silicon Carbide (SiC) and Gallium Nitride (GaN), which offer superior switching performance. The blending factor for the zero vectors can be fixed or can adjust based on operational parameters. These parameters include torque, speed, and voltage. Periodic or random adjustments of the weighted zero vector can also be incorporated to further modify the electric motor's sound and vibration output.

In some exemplary embodiments, PWM pulses are generated using fixed weighted percentages of the zero vectors derived from SVPWM and GDPWM. This process establishes NVH behavior that exceeds GDPWM performance while maintaining power loss properties between SVPWM and GDPWM. Weight modification for the SVPWM and GDPWM zero vectors can be implemented as a function of torque, speed, voltage, and modulation index. This facilitates smooth transitions between SVPWM and GDPWM operation during vehicle dynamics, such as acceleration events. Further weight modification can occur based on fixed multiples of a configurable period. This permits generation of a specific sound character and intermediate PWM loss. Additionally, weight modification can utilize randomized multiples of a configurable period. Randomized modification of the zero vector weight, calculated from SVPWM and GDPWM zero vectors, is also employed. Dithering of the weighted PWM over a fixed dither frequency is another method that can be employed.

Figure 7:
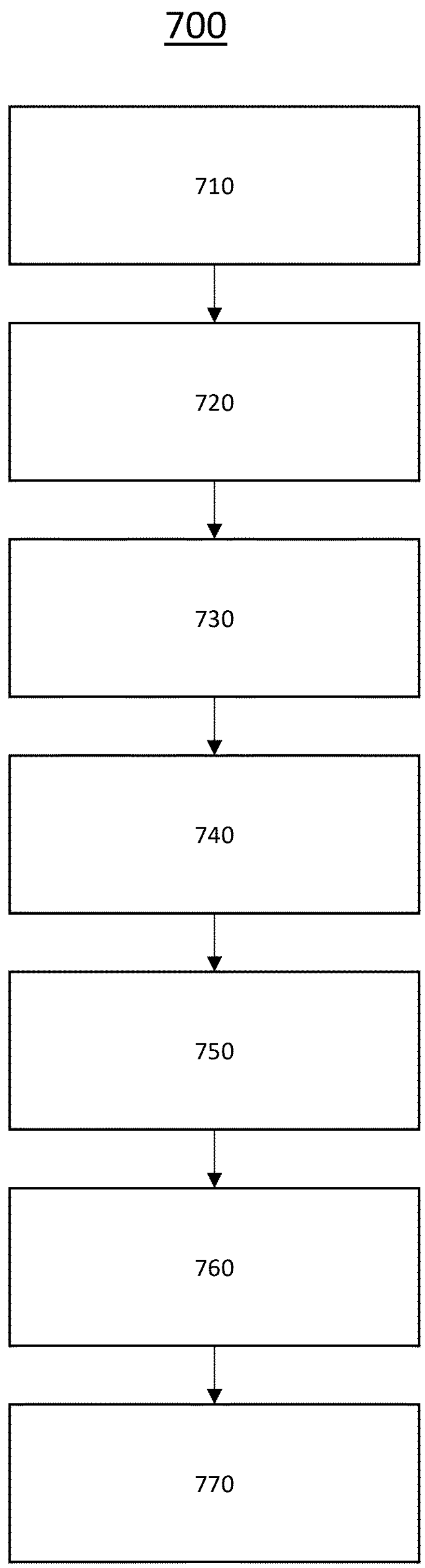
FIG. 7 shows a flow chart illustrating a method for pulse width modulation control zones for a hybrid power stage according to an exemplary embodiment of the present disclosure.

Turning now to FIG. 7, a flow chart illustrating a method 700 for pulse width modulation control zones for a hybrid power stage according to an exemplary embodiment of the present disclosure is shown. The method 700 is first started 710. The algorithm performing the method, run by a propulsion controller or inverter controller or the like, can be initiated at system power-up. Upon receiving a run command, the method 700 can load pre-calibrated motor parameters and control gains. A pulse width modulation (PWM) generator then receives duty cycle commands, which are derived from a rotor position sensor and a torque demand signal. This process generates switching signals for the inverter's power semiconductor devices, enabling current flow to the electric motor. Closed-loop control systems subsequently adjust these signals based on measured motor currents and speeds, maintaining desired motor performance.

Following startup, the method 700 can next calculate 720 space vector pulse width modulation (SVPWM) zero vector. This stage determines the duration or application time of the zero voltage vector as prescribed by the SVPWM technique. In an electric vehicle inverter controller, the SVPWM algorithm calculates the zero vector duration after determining the active vector durations. A reference voltage vector, representing the desired motor voltage, is first mapped into a two-dimensional space. This space is divided into six sectors, each corresponding to a unique combination of two adjacent active voltage vectors. The algorithm then calculates the time durations for these two active vectors to synthesize the reference vector within a given switching period. The zero vector duration is then calculated as the remaining time. In some exemplary embodiments, this calculated zero vector time can be split into two equal parts and applied at the beginning and end of the switching sequence to minimize harmonic distortion and switching losses.

The method 700 is next operative to calculate 730 a general discontinuous PWM (GDPWM) zero vector. This step computes the zero vector duration according to the GD PWM method. In some exemplary embodiments, the inverter controller calculates GDPWM zero vector by first determining the total switching period and the durations of the active voltage vectors required to synthesize the reference voltage. The total zero vector time is the remainder of the switching period after subtracting the active vector durations. This total zero vector time is then distributed discontinuously across the three inverter legs. The distribution strategy can involve identifying the phase with the highest current magnitude or a specific voltage range. The identified phase is then clamped to either the positive or negative DC bus for a portion of the switching period, concentrating the zero vector application within that phase's switching pattern. This process minimizes switching events in the clamped phase, reducing overall switching losses.

After obtaining both SVPWM and GDPWM zero vectors, the method 700 is next operative to calculate 740 a weighting factor per operating point. This involves determining a specific weighting coefficient based on the current operational parameters of the AC machine, such as torque, speed, or voltage. This weighting factor dictates the blend ratio between the SVPWM and GDPWM zero vectors. In some exemplary embodiments, the inverter controller determines a weighting factor for zero vector allocation based on the electric machine's operational state. This calculation involves mapping measured parameters, including motor speed, torque, and DC link voltage, to a pre-defined multi-dimensional characteristic curve or lookup table. The resulting weighting coefficient, typically ranging from zero to one, establishes the proportional blend between SVPWM and GDPWM zero vector durations. For example, a coefficient value of zero can allocate all zero vector time to SVPWM, targeting reduced switching power loss, while a coefficient value of one allocates all zero vector time to GDPWM, targeting minimized noise, vibration, and harshness. Intermediate coefficient values linearly combine the zero vector contributions from both strategies, achieving a trade-off between power efficiency and acoustic performance across the operating envelope The calculated weighting factor is then utilized to calculate 750 the weighted zero vector. A composite zero vector is derived by combining the previously calculated SVPWM and GDPWM zero vectors according to the determined weighting factor. The weighted zero vector is calculated as a linear combination of the zero vectors from SVPWM and GDPWM. The composite zero vector's duration is a function of the SVPWM zero vector duration, the GDPWM zero vector duration, and a weighting factor. This weighting factor, typically ranging from zero to one, determines the contribution of each individual zero vector to the composite. When the weighting factor is zero, the composite zero vector is identical to the SVPWM zero vector. When the weighting factor is one, the composite zero vector is identical to the GDPWM zero vector. For intermediate values, the composite zero vector is a weighted average, distributing the total zero vector time between the two methods based on the weighting factor.

The method 700 next generates 760 the weighted PWM, wherein the actual PWM pulses are produced using the calculated weighted zero vector to control the inverter switches. In some exemplary embodiments, the inverter controller generates weighted PWM pulses by modulating the switching times of the inverter's power devices. The calculated weighted zero vector duration is split into two equal parts. One part is applied at the beginning of the switching period, and the other part is applied at the end. The active vector durations, determined from the SVPWM and GDPWM algorithms, are positioned between these zero vector intervals. The controller's pulse generation hardware receives these timing signals and produces gate driver pulses for the inverter's switches. This process ensures that the total switching period is occupied by the combined durations of the weighted zero vector and the active vectors, resulting in the desired output voltage and frequency. The flowchart concludes 770 with a stop function, indicating the termination of the PWM generation cycle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An electric vehicle propulsion system comprising:

a battery for supplying a direct current voltage;

an inverter including a first inverter leg, a second inverter leg and a third inverter leg for converting the direct current voltage to an alternating current voltage in response to a first inverter leg control signal coupled to the first inverter leg, a second inverter leg control signal coupled to the second inverter leg, and a third inverter control signal coupled to the third inverter leg, and for coupling the alternating current voltage to an electric motor; and an inverter controller for generating the first inverter control signal in response to a first vehicle parameter, the second inverter control signal in response to the first vehicle parameter and the third inverter control signal in response to the first vehicle parameter wherein the first inverter control signal is indicative of a first pulse width modulated signal having a one hundred percent duty cycle and wherein the third inverter control signal is indicative of a third pulse width modulated signal having a less than one hundred percent duty cycle and wherein the first vehicle parameter includes an inverter coolant temperature exceeding a threshold temperature.

2. The electric vehicle propulsion system of claim 1, wherein the inverter controller is further configured for calculating a space vector pulse width modulation (SVPWM) zero vector, calculating a general discontinuous pulse width modulation (GDPWM) zero vector, determining a weighting factor based on at least one operational parameter of an alternating current machine connected to the inverter, wherein the operational parameter includes at least one of torque, speed, and voltage, calculating a weighted zero vector by combining the SVPWM zero vector and the GDPWM zero vector according to the determined weighting factor, and generating pulse width modulation (PWM) pulses for controlling switches of the inverter using the calculated weighted zero vector.

3. The electric vehicle propulsion system of claim 1, wherein the first pulse width modulated signal and the second pulse width modulated signal are space vector pulse width modulated signal.

4. The electric vehicle propulsion system of claim 1, wherein the second inverter control signal is indicative of a second pulse width modulated signal having a one hundred percent duty cycle.

5. The electric vehicle propulsion system of claim 1, wherein the second inverter control signal is indicative of a second pulse width modulated signal having a less than one hundred percent duty cycle and wherein the inverter coolant temperature exceeds s second threshold temperature wherein the second threshold temperature is greater than the threshold temperature.

6. The electric vehicle propulsion system of claim 1, wherein the inverter control is further configured for determining a torque/speed operating region in response to a torque command and a speed command and wherein the first inverter control signal, second inverter control signal and the third inverter control signal are determined in response to the torque/speed operating region.

7. The electric vehicle propulsion system of claim 1, wherein the less than one hundred percent duty cycle is varied between zero percent and ninety nine percent in incremental angles.

8. The electric vehicle propulsion system of claim 1, wherein third inverter control signal is generated in response to a transistor material of the third inverter leg.

9. The electric vehicle propulsion system of claim 1, wherein the first inverter leg includes a first transistor, the second inverter leg includes a second transistor and the third inverter leg includes a third transistor.

10. A method of controlling an inverter in an electric vehicle propulsion system comprising:

receiving, at an inverter input, a direct current voltage from a battery;

a battery for supplying a direct current voltage;

converting, by the inverter including a first inverter leg, a second inverter leg and a third inverter leg, the direct current voltage to an alternating current voltage in response to a first inverter leg control signal coupled to the first inverter leg, a second inverter leg control signal coupled to the second inverter leg, and a third inverter control signal coupled to the third inverter leg, and generating, by an inverter controller, the first inverter control signal in response to a first vehicle parameter, the second inverter control signal in response to the first vehicle parameter and the third inverter control signal in response to the first vehicle parameter wherein the first inverter control signal is indicative of a first pulse width modulated signal having a one hundred percent duty cycle and wherein the third inverter control signal is indicative of a third pulse width modulated signal having a less than one hundred percent duty cycle and wherein the first vehicle parameter includes an inverter coolant temperature exceeding a threshold temperature; and coupling the alternating current voltage to an electric motor.

11. The method of controlling the inverter in the electric vehicle propulsion system of claim 10, further including calculating a space vector pulse width modulation (SVPWM) zero vector, calculating a general discontinuous pulse width modulation (GDPWM) zero vector, determining a weighting factor based on at least one operational parameter of an alternating current machine connected to the inverter, wherein the operational parameter includes at least one of torque, speed, and voltage, calculating a weighted zero vector by combining the SVPWM zero vector and the GDPWM zero vector according to the determined weighting factor, and generating pulse width modulation (PWM) pulses for controlling switches of the inverter using the calculated weighted zero vector.

12. The method of controlling the inverter in the electric vehicle propulsion system of claim 10, wherein the first pulse width modulated signal and the second pulse width modulated signal are space vector pulse width modulated signal.

13. The method of controlling the inverter in the electric vehicle propulsion system of claim 10, wherein the second inverter control signal is indicative of a second pulse width modulated signal having a one hundred percent duty cycle.

14. The method of controlling the inverter in the electric vehicle propulsion system of claim 10, wherein the second inverter control signal is indicative of a second pulse width modulated signal having a less than one hundred percent duty cycle and wherein the inverter coolant temperature exceeds s second threshold temperature wherein the second threshold temperature is greater than the threshold temperature.

15. The method of controlling the inverter in the electric vehicle propulsion system of claim 10, wherein the inverter control is further configured for determining a torque/speed operating region in response to a torque command and a speed command and wherein the first inverter control signal, second inverter control signal and the third inverter control signal are determined in response to the torque/speed operating region.

16. The method of controlling the inverter in the electric vehicle propulsion system of claim 10, wherein the less than one hundred percent GDPWM is varied between zero percent and one hundred percent in incremental angles.

17. The method of controlling the inverter in the electric vehicle propulsion system of claim 10, wherein third inverter control signal is generated in response to a transistor material of the third inverter leg.

18. The method of controlling the inverter in the electric vehicle propulsion system of claim 10, wherein the first inverter leg includes a first silicon transistor, the second inverter leg includes a second silicon transistor and the third inverter leg includes a first silicon carbide transistor.

19. An electric vehicle propulsion system comprising:

a battery for supplying a direct current voltage;

an inverter including a first inverter leg, a second inverter leg and a third inverter leg for converting the direct current voltage to an alternating current voltage in response to a first inverter leg control signal coupled to the first inverter leg, a second inverter leg control signal coupled to the second inverter leg, and a third inverter control signal coupled to the third inverter leg, and for coupling the alternating current voltage to an electric motor;

an inverter controller for generating the first inverter control signal in response to a first vehicle parameter, the second inverter control signal in response to the first vehicle parameter and the third inverter control signal in response to the first vehicle parameter wherein the first inverter control signal is indicative of a first pulse width modulated signal having a one hundred percent duty cycle and wherein the third inverter control signal is indicative of a third pulse width modulated signal having a less than one hundred percent duty cycle and wherein the first vehicle parameter includes an inverter coolant temperature exceeding a threshold temperature; and an electric motor configured to propel a vehicle in response to the alternating current voltage.

20. The electric vehicle propulsion system of claim 19, wherein the third pulse width modulated signal is a discontinuous pulse width modulated signal and the first pulse width modulated signal and the second pulse width modulated signal are space vector pulse width modulated signals.

* * * * *